Patented May 10, 1949

2,469,404

UNITED STATES PATENT OFFICE 2,469,404

POLYACETAL POLYSULFIDE POLYMERS

Joseph C. Patrick, Morrisville, Pa., assignor to Thiokol Corporation, Trenton, N. J., a corporation of Delaware No Drawing. Application August 29, 1944, Serial No. 551,775

4 Claims. (Cl. 260—608)

This invention relates to polysulfide polymers. Such polymers are characterized by recurring —SS— linkages in the chains thereof, each of the sulfur atoms of these linkages being firmly bound to adjacent carbon atoms. To these sulfur atoms additional loosely bound labile or isosulfur may be joined and the total sulfur of the linkages may vary from 2 to 6 atoms.

What has now become known technique for the manufacture of these polymers comprises reacting a soluble polysulfide with an organic compound containing two carbon atoms to each of which is attached a substituent split off by said reaction. For example, a soluble polysulfide may be reacted with a dichloralkane, e. g., ethylene dichloride or in general with an organic compound containing two carbon-attached substituents which substituents are split off by reaction with said polysulfide. See, for example, Patrick Patents 1,890,191, December 6, 1932; and 2,216,044, September 24, 1940, and other Patrick patents, including 2,255,228, September 9, 1941.

The object of the present invention is to provide new methods, techniques, and products in or relating to the field of polysulfide and polyacetyl polymers.

In accordance with the present invention, a monomeric organic compound is prepared or provided which not only contains an —SS— but also is a glycol and may generically be defined as a glycol having two carbon atoms joined to and separated by intervening structure characterized by an —SS— linkage, to each of which carbon atoms there is attached an alcoholic hydroxyl group. It may also be defined as a polythio glycol or glycol polysulfide.

The monomeric organic compound so provided is then polymerized or condensed with an aldehyde. The resulting polymeric product has a dual character. It is a polyacetal polymer and, since it has recurring —SS— linkages, it is also a polysulfide power. It may be identified as an organic polyacetal polysulfide polymer. If the sulfur linkages are exclusively —SS— or substantially so (and that is the preferred structure) the product may be identified as a polyacetal disulfide polymer. If formaldehyde is the condensing agent, the corresponding product is a polyformal disulfide polymer. The polyacetal or polyformal polysulfide or disulfide may in accordance with this invention be reacted with a soluble polysulfide to obtain a further and different type of polymerization and the resulting polymer may be subjected to curing or vulcanizing as hereinafter set forth.

Examples of the polythio glycols or glycol polysulfides are as follows:

1. $OH(CH_2)_n.SS.(CH_2)_nOH$
where $n$ may vary from 2 to 20 or more

2. $OH.CH_2.CH.CH_2.SS.CH_2.CH.CH_2.OH$ with $CH_3$ groups on the middle carbons

3. $OH.CH_2$—⬡—$CH_2.SS.CH_2$—⬡—$C_4H_8OH$

4. $CH_3.CH.CH_2.CH_2.SS.CH_2.CH_2.CH.CH_3$ with $OH$ groups

5. 
$$\begin{array}{cc} HC\!\!-\!\!\!-\!\!CH & HC\!\!-\!\!\!-\!\!CH \\ \| & \| \\ OH.CH_2.C\;\;\;C.CH_2.SS.CH_2.C\;\;\;C.CH_2OH \\ \diagdown O \diagup & \diagdown O \diagup \end{array}$$

6. $OH.CH_2.CH_2.O.CH_2.O.CH_2.CH_2.SS.CH_2.CH_2.OH$

7. $OH.CH_2CH_2O.CH_2.CH_2.SS.CH_2.CH_2.O.CH_2.CH_2.OH$

8. $OH.CH_2.CH\!=\!CH.CH_2.SS.CH_2.CH\!=\!CH.CH_2.OH$

9. $CH_3.CH.CH_2.SS.CH_2.CH.CH_3$ with $OH$ groups

10. $CH_3.CH_2.CH.CH_2.SS.CH_2.CH.CH_2.CH_3$ with $OH$ groups

11. $CH_3.CH_2.CH_2.CH.CH_2.SS.CH_2.CH.CH_2.CH_2.CH_3$ with $OH$ groups

12. $CH_3.CH_2.SS.CH_2.CH.CH_2.CH_2.CH_3$ with $OH$ groups

13. $CH_3.CH.CH_2.SS.CH_2.CH.CH_2.CH_2.CH_3$ with $OH$ groups

14. ⬡—$CH_2.CH.CH_2.SS.CH_2.CH_2$ with $OH$ groups

15. $CH_3.CH\!-\!CH.SS.CH.CH.CH_3$ with $CH_3$ and $OH$ groups

In the above compounds labile or isosulfur may be joined to the —SS— linkages so that the linkages may be $$-\!\overset{S}{\underset{\|}{S}}\!-\quad -\!\overset{SS}{\underset{\|\;\|}{SS}}\!-\quad -\!\overset{SS}{\underset{\|\;\|}{S\;S}}\!-\!\!\underset{S}{\|}\quad -\!\overset{SS}{\underset{\|\;\|}{S\;S}}\!-\!\!\underset{SS}{\|\|}$$

These compounds may be identified generically as polythio glycols or glycol polysulfides. They can be prepared in a number of specifically different ways one of which may be indicated and illustrated with reference to the compounds identified as 1 above which may be described generically as dihydroxy dialkylene polysulfides. For example, dihydroxy diethyl disulfide may be prepared by reacting ethylene chlorhydrin with a solution of sodium disulfide. Sodium chloride is split off and the dihydroxy diethyl radicals condense, through a disulfide linkage or bridge. Soluble polysulfides other than the disulfide may be used to obtain polythio glycols or glycol polysulfides where the sulfide linkage contains more than two sulfur atoms, e. g., 3 to 6 sulfur atoms. By analogous procedure all of the polythio glycols may be prepared.

In accordance with the invention, a compound falling within the broad genus above described is reacted with an aldehyde. By this term is meant the class of aldehydes in general, including formaldehyde, acetaldehyde, propionaldehyde, butyraldehyde, and other aldehydes of the alkane series; aldehydes of the alicyclic series, aldehydes of the heterocyclic series as for example, furfuraldehyde commonly known as furfural as well as aldehydes of the so-called aromatic or aryl series, as for example benzaldehyde and so forth. Ordinary formaldehyde in its various forms, as for example, in the form of the well known commercial formalin as well as in other and modified forms, e. g., paraformaldehyde, etc., is a highly reactive species of formaldehyde, is also readily available commercially and cheap and may be employed with advantage.

The following specific example is given purely to illustrate the principles of the invention which have been described and will be defined in the claims.

Example 2 mols of ethylene chlorhydrin (161 grams of the anhydrous material) are reacted with 500 cc. of a 2-molar solution of $Na_2S_2$ by slow addition of the chlorhydrin to the stirred polysulfide solution keeping the temperature between 30 and 40° C. After the addition of the chlorhydrin is complete, the temperature is raised to about 80° C. and agitation is stopped. The heavy oily reaction product (dithio glycol) is settled out, removed to a separatory funnel and treated with its own volume of benzene and washed once with water to remove salts. After separation from the water layer, the benzene solution is treated with 1 mol of paraformaldehyde and heated from about 80 to 90° C. in the presence of about 0.01 mol of hydrochloric acid. This operation is best performed in an esterification flask equipped with a reflux condenser and water trap so that the benzene can be continuously returned to the reaction flask and the water formed can be withdrawn from time to time. A high molecular weight polyformal disulfide is formed as a result of the above operation over a period of from 10 to 12 hours. When approximately the theoretical amount of water has been formed, 1 mol in this case, the benzene is distilled off. The product is a highly viscous liquid. Instead of distilling off the benzene as above stated, refluxing may be continued for say six hours, to obtain further polymerization of the polyformal polysulfide, and the benzene then may be removed by distillation.

At this point the product obtained as above described and which may be referred to as a water insoluble polyformal polysulfide is a highly viscous liquid and may be used as a plasticizer for various synthetic resins, plastics, and products of a rubber-like nature. It may also be used for impregnating porous materials such as organic and inorganic textile fabrics to render the same water-proof. A further and special use of this oily reaction product lies in the field of high pressure lubricants. Tests made in a hydraulic press when this oil was placed between parallel steel plates showed that it possesses very great resistance to displacement under high pressure. For this purpose the product can be used as such or dissolved in a solvent.

Instead of the particular polythio glycol used in the above example, glycols in general having two carbon atoms to each of which a hydroxyl group is attached, said carbon atoms being joined to and separated by intervening structure characterized by an —SS— linkage, may be used.

Instead of the particular aldehyde employed in the above example, aldehydes in general may be employed as above stated, in which case polyacetal polysulfides will be formed.

By reacting mixtures of chlorhydrins, e. g., a mixture of ethylene chlorhydrin and propylene chlorhydrin with a soluble polysulfide, mixtures of polythio glycols can be obtained and reacted with an aldehyde or mixture of aldehydes. Indeed, mixtures of any two or more of the above polythio glycols or other polythio glycols embraced within the definition herein given may be reacted with aldehydes, thus producing copolymeric polyacetal polysulfide polymers. A single aldehyde may be reacted with such a mixture or a mixture of aldehydes may be so reacted.

The various glycerol chlorhydrins may also be reacted with soluble polysulfides to produce polythio glycols or glycol polysulfides and these may be reacted with formaldehyde or other aldehydes, as such or in admixture with any other polythio glycols, to make polyacetal polymers which may be used as such or reacted with soluble polysulfides to obtain the further and different kind of polymer formation hereinbelow described.

After the completion of the condensation reaction as above described, a further and different kind of condensation or polymerization may be effected in accordance with the present invention, that is, the reaction of the polyformal or polyacetal polysulfide with a soluble polysulfide, as for example, a polysulfide of sodium, potassium, lithium, caesium, ammonium, etc. The soluble polysulfides are not limited to the inorganic kind since organic soluble polysulfides, e. g., the various alkyl substituted ammonium polysulfides may also be used. An illustrative example of this special polymerizing after-treatment will be given as follows:

1 empirical molecular weight of the polyformal polysulfide derived in Example 1 is dispersed in water by any suitable means, e. g., by the use of a high-speed agitator and a dispersion agent, if necessary, and the aqueous dispersion so obtained is treated with an equal molar ratio of, for example, sodium tetrasulfide and heated with agitation for a period of 1 hour, after which the dispersion is allowed to settle and the supernatant liquid is withdrawn. The dispersion can be readily washed by repeating treatment with water with intermediate settling out of the insoluble dispersion. When sufficiently purified, the material is treated with acid which causes coagulation to a rubber-like mass.

At this point the product may be used as a soft rubber-like coating material and for various other purposes. It possesses, nevertheless, the special property of reacting with vulcanizing or curing agents and when so treated undergoes a transformation whereby a number of useful properties are developed, including marked increase in mechanical strength and resistance to solvents and chemicals. In other words, a transformation occurs which bears an analogy to the vulcanization of rubber. No sulfur is, however, necessary to effect the said vulcanizing or curing, the curing agents being generally of an oxide or oxidizing character, as for example, zinc oxide, lead oxide, cupric oxide, lead peroxide, etc.

Purely by way of example, the following illustrations is given of the curing operation. A compound is made according to the following formula:

| | Parts by weight |
|---|---|
| Polymer as above obtained | 100 |
| Lead oxide | 5 |
| Carbon black | 40 |

These various ingredients are incorporated, preferably on a rubber mill, and the compounded material is then subjected to heat temperature of about 140° C. for 30 to 40 minutes and are preferred to effect curing of this compound.

What is claimed is:

1. Process which comprises heating formaldehyde with a glycol having the general formula OH.R.SS.R.OH when R is a divalent alkylene radical condensing the formaldehyde and said glycol and obtaining a polymeric condensation product.

2. Process which comprises heating formaldehyde with a glycol having the formula $$OH.C_2H_4.SS.C_2H_4.OH$$

condensing the formaldehyde and said glycol and obtaining a polymeric condensation product.

3. A polyformal condensation product of formaldehyde and a glycol obtained according to the process of claim 1.

4. A polyformal condensation product of formaldehyde and a glycol obtained according to the process of claim 2.

JOSEPH C. PATRICK.

REFERENCES CITED

The following references are of record in the file of this patent:

UNITED STATES PATENTS

| Number | Name | Date |
|---|---|---|
| 2,199,361 | Lincoln | Apr. 30, 1940 |
| 2,246,321 | Rosen | June 17, 1941 |
| 2,295,760 | Schreiber | Sept. 15, 1942 |
| 2,320,819 | D'Alelio | June 1, 1943 |
| 2,347,436 | Root | Apr. 25, 1944 |

OTHER REFERENCES

Gams et al., "Melamine-Formaldehyde Condensation Products," British Plastics, Feb. 1943, pages 508–520.